United States Patent [19]

Wakabayashi

[11] Patent Number: 4,928,804

[45] Date of Patent: May 29, 1990

[54] FREE WHEEL HUB CLUTCH

[75] Inventor: Hideaki Wakabayashi, Nagoya, Japan

[73] Assignee: Aisin Seiki Kabushiki Kaisha, Kariya, Japan

[21] Appl. No.: 315,160

[22] Filed: Feb. 24, 1989

[30] Foreign Application Priority Data

Feb. 29, 1988 [JP] Japan ................... 63-046386

[51] Int. Cl.⁵ ............. F16D 1/06; B60K 23/08
[52] U.S. Cl. .................. 192/83; 192/84 R; 192/95; 403/1; 180/247
[58] Field of Search ............ 192/32, 35, 40, 49, 192/50, 67 R, 83, 84 R, 93 A, 95; 403/1; 180/247

[56] References Cited

U.S. PATENT DOCUMENTS

| 3,753,479 | 8/1973 | Williams | 192/95 X |
|---|---|---|---|
| 4,007,820 | 2/1977 | Kagata | 192/67 R |
| 4,192,411 | 3/1980 | Fogelberg | 192/49 X |
| 4,212,557 | 7/1980 | Overbeek | 403/1 |
| 4,534,455 | 8/1985 | Fujikawa | 192/40 |
| 4,694,943 | 9/1987 | Petrak | 192/35 |
| 4,775,040 | 10/1988 | Telford | 192/67 R |
| 4,776,441 | 10/1988 | Kagata et al. | 192/0.02 R |
| 4,811,824 | 3/1989 | Kurihara | 192/35 |

FOREIGN PATENT DOCUMENTS

| 53-93241 | 8/1978 | Japan | 192/50 |
|---|---|---|---|
| 62-143737 | 6/1987 | Japan | 180/247 |

Primary Examiner—Leslie A. Braun
Assistant Examiner—Richard M. Lorence
Attorney, Agent, or Firm—Burns, Doane, Swecker & Mathis

[57] ABSTRACT

A free wheel hub clutch for a drive shaft includes an outer casing, an inner sleeve in the casing for connection to the drive shaft, a slidable clutch in the casing for movement between a lock position wherein the clutch is connected therewith, and a free position wherein the clutch is disconnected from the inner sleeve for free rotation with respect thereto. The slidable clutch selectively and alternatively moves the clutch between the lock position and the free position, either mannually or remotely.

3 Claims, 2 Drawing Sheets

FREE WHEEL HUB CLUTCH

BACKGROUND OF THE INVENTION

1. Field of the Invention

The present invention relates to a free wheel hub clutch and more particularly to a free wheel hub clutch which locks an axle shaft and a wheel hub during four-wheel driving position and disengages the axle shaft from the wheel hub in two-wheel driving position.

2. Description of the Related Art

A conventional free wheel hub clutch related to the present invention is disclosed, for instance, in Japanese Patent Laid-Open publication No. 59(1984)-51620 and U.S. Pat. No. 4,776,441.

The Japanese Patent type of free wheel hub clutch includes a cylindrical body fixed to an external end of a wheel rib rotatably connected to an external end of an axle tube. An inner sleeve is linked to an external end projection of the axle which is inserted through the axle tube within the cylindrical body so as to permit the transmitting of a driving force. A clutch member is attached to the cylindrical body so that it is axially slidable and a handle is rotatably fitted to the cylindrical body. A cam follower is provided for initiating the clutch member engagement with the inner sleeve by making the clutch member slide in the axial direction while interlocking with the handle. The arrangement is such that the transmission of the driving force becomes possible by manually turning the handle in order to cause the clutch member to mesh with the inner sleeve.

The U.S. Pat. No. 4,776,441 discloses a type of free wheel hub which includes a motor linked to a handle. The free wheel hub clutch is compact and a power source is built in to thereby change over the clutch engagement of the driving wheel from a driver's seat. There is provided a free wheel hub clutch wherein the motor is incorporated in the cylindrical body. The motor is linked to the handle and, at the same time, the motor is fitted to the side wall of the body.

SUMMARY OF THE INVENTION

A primary object of this invention is to provide an remotely operable free wheel hub clutch. To produce the above mentioned free wheel hub clutch, when the free wheel hub clutch is remotely inoperable, an operator of the vehicle can control the free wheel hub clutch manually.

Another object of the present invention is to provide a free wheel hub clutch in which disadvantages of the conventional apparatus is eliminated.

These and other objects, features and advantages of the present invention will become more apparent with respect to the following detailed description and with reference to the attached drawings.

DETAILED DESCRIPTION OF A PREFERRED EMBODIMENT

Figure 1:
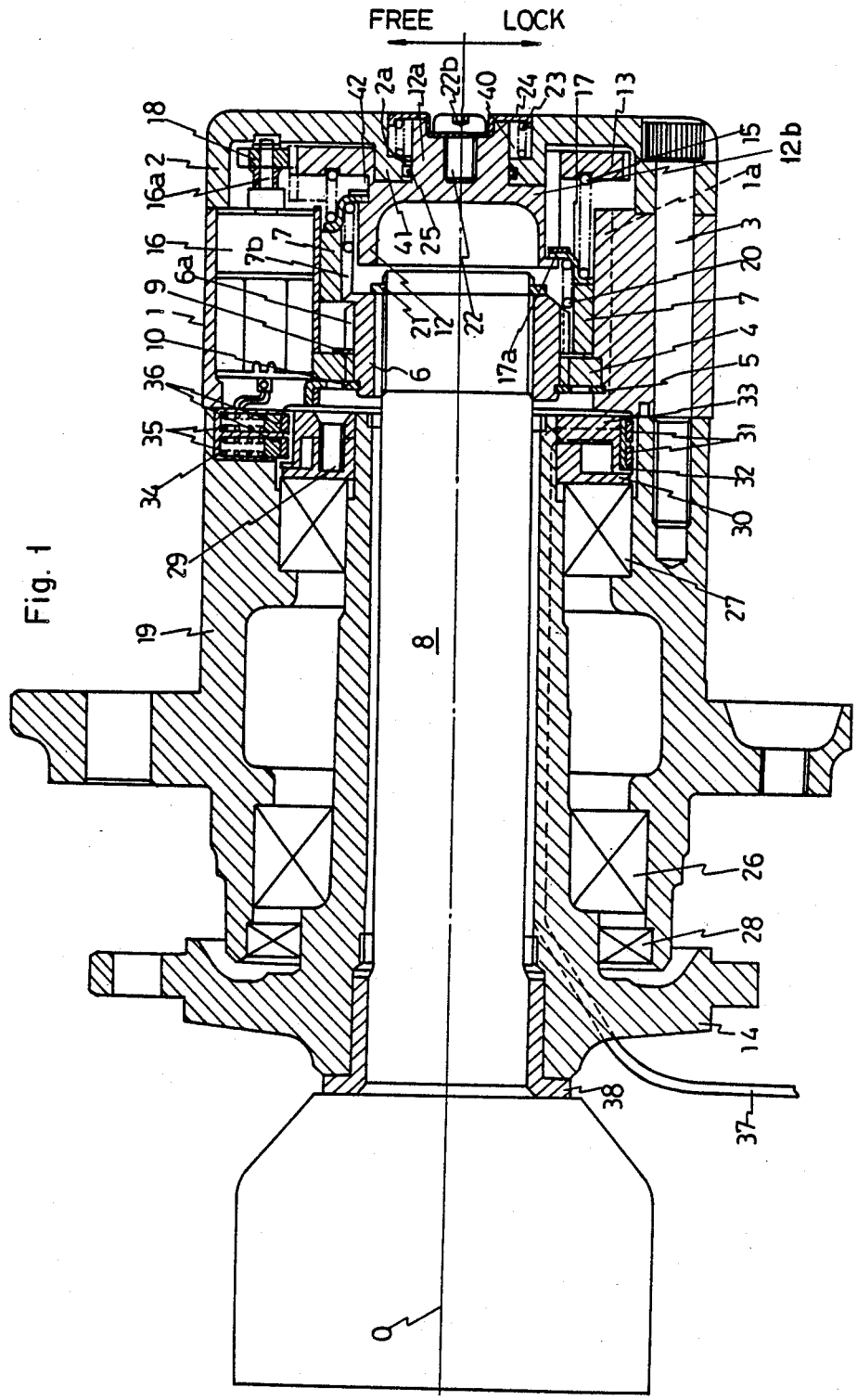
FIG. 1 shows a sectional side elevational view of this invention, the upper portion shows the free position and the lower portion shows the lock position of this invention.

An embodiment of the present invention will hereinafter be described with reference to FIGS. 1 and 2.

In a free wheel hub clutch according to the present invention, a cylindrical body 1 is fixed by a bolt or other fastening means 3 to an external end portion of a wheel hub 19 which is rotatably installed on an external end portion of an axle tube 14. A plurality of bearings 26 and 27 are positioned between the axle tube 14 and the wheel hub 19. A sealing member 28 is connected between the axle tube 14 and the wheel hub 19. A sliding bearing means 38 is inserted between an axle shaft 8 and axle tube 14. An electrical connector 37 is positioned in the axle tube 14. A rock nut 30 is fastened to the axle tube 14 by a bolt or other fastening means 29, and the lock nut 30 faces the bearing 27. In addition, a drum 33 is fastened to the axle tube 14 by the bolt means. The drum 33 is connected to the rock nut 30 by the bolt means 29 as an integral body.

A plurality of slip rings 31 are arranged radially outside of the drum 33. An isolator 32 is positioned between the drum 33 and the slip rings 31. One side of the electrical connector 37 is connected to the slip rings 31, and the other side of the electrical connector 37 is connected to an electric operating system (not shown) which is positioned in a vehicle equipped with the free wheel hub clutch. A distributing mechanism 34 is arranged in the wheel hub 19. A plurality of brushes 36 are electrically connected to the slip rings 31. Brush springs 35 are arranged between the brushes 36 and the wheel hub 19 through a brush case.

In the cylindrical body 1, a ring 4 is positioned between a plate 9 and snap rings 5 and 10. The plate 9 is rotatably supported on the outer periphery of an inner sleeve 6 which is adjacent to the ends of a plurality of splines 6a on the inner sleeve 6. The snap ring 5 is held by the cylindrical body 1 and the snap ring 10 is supported in the inner sleeve 6. The inner sleeve 6 rotates together with the axle shaft 8 and is rotatably supported by the ring 4. The inner sleeve 6 is fixed to the axle shaft 8 by a snap ring 21. A handle 12 is rotatably supported by a bushing 41 of a case cover 2 attached to the cylindrical body 1 by the bolt 3. A cam surface 42 is formed on the circumference of a boss 12b of the handle 12. A pawl 17a of a cam follower 17 is in slidable engagement with the outer periphery of the boss 12b of the handle 12. A slidable spline clutch 7 is provided by axial movement of the cam follower 17. The slidable spline clutch 7 is installed so that it is axially slidable between its outer peripheral surface and the inner peripheral surface of the cylindrical body 1 while being prevented from rotating relative to the cylindrical body 1 by splines 1a on the radially outer peripheral surface thereof.

Springs 15 and 20 are positioned to extend between the slidable spline clutch 7 and the cam follower 17, and between the cam follower 17 and the handle 12, respectively. Splines 7b and 6a, which are capable of engaging with each other, are provided both on the inner peripheral of the slidable clutch means 7 and on the outer peripheral surface of the inner sleeve 6.

A motor 16 includes a shaft 16a provided in the side wall of the wheel hub 19. A pinion gear 18 is connected to the shaft 16a of the motor 16, so as to be rotated therewith.

An opening 2a is formed at the center of the case cover 2. A boss 12a is slidably received through the opening 2a. At the edge of the opening 2a, an annular groove is formed there along the opening 2a. In the groove of the handle 12, a sealing member 25 is disposed, so as to provide a fluid-tight seal between the boss 12a of the handle 12 and opening 2a of the case cover 2.

A gear portion 13 is formed at an inner edge of the handle 12 and the pinion gear 18 and the gear portion 13 of the handle 12 are operatively connected to each other. A notch 40 is formed in the center portion of the case cover 2. The notch 40 and the opening 2a are formed concentrically about the axis "0". A spring seat 24 is fixed to an external portion of the handle 12 by a fastening means 22. At the external portion of the bolt means 22, a connectable portion 22b is formed. The connecting portion 22b of the bolt means 22 is connectable with a tool having an end portion provided with a hexagonal cross section (not shown). A spring 23 is positioned between the notch 40 of the case cover 2 and the spring seat 24.

Figure 2:
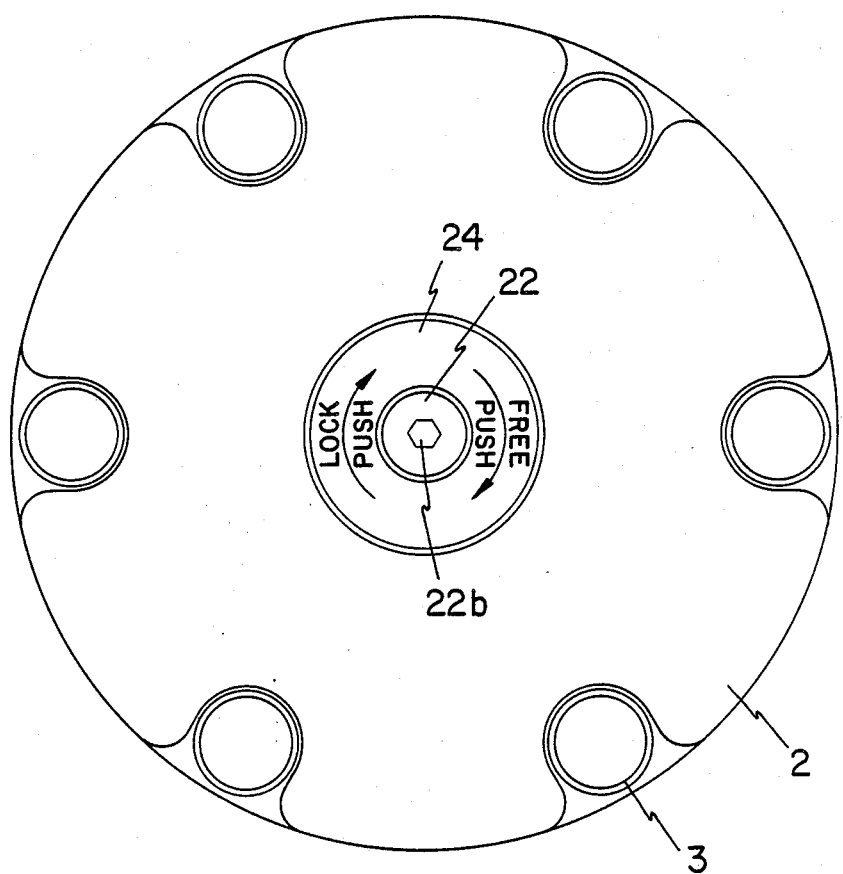
FIG. 2 shows a side view of this invention.

FIG. 2 shows a side view of the free wheel hub clutch. The case cover 2 is fixed to the cylindrical body (not shown in the FIG. 2) by plurality of bolts 3. The bolt means 22 is arranged at the center position of the free wheel hub clutch. At the center portion of the bolt means 22, the connectable portion 22b is formed. The connectable portion 22b shows a hexagonal opening adapted to receive the hexagonal tool.

By the foregoing arrangement, the clutch may be remotely engaged and disengaged from a location in the vehicle. By remote actuation, the motor 16 is energized to rotate pinion gear 18 and gear portion 13, engaged therewith. By the sliding interconnection of the splines 6a and 7b, the clutch is remotely engaged upon the driven rotation of the gear portion 13 operating against the biasing force of the spring system. For automatic disengagement, the reverse rotation of gear portion 13 relieves the biasing force of the spring system and permits splines 6a and 7b to disengage.

For manual operation, the tool means is inserted into the connectable portion 22b so as to rotate the handle 12 and boss portions 12a and 12b so as to again compress the spring system and permit the cam and cam follower arrangement 42 and 17, respectively, to cause engagement of the splines 6a and 7b and, thereby, the engagement of the clutch.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A free wheel hub clutch for an axle shaft, comprising:
   an outer casing;
   inner sleeve means in the casing for connection to the axle shaft;
   slidable clutch means in the casing for selecting alternating movement between a lock position wherein the clutch means is connected with the inner sleeve means, and a free position wherein the clutch means is disconnected from the inner sleeve means for free rotation with respect thereto; and
   manual operating means for manually alternating the movement of the clutch means between the lock position and the free position;
   remote operating mans for remotely alternating the movement of the clutch means between the lock position and the free position.

2. The free wheel hub clutch of claim 1, wherein the manual operating means comprises a rotatable handle for manually moving the clutch means and said remote operating means comprises a motor means for remotely moving the clutch means.

3. The free wheel hub clutch of claim 2 wherein the outer casing comprises a cover having an opening therein, the handle being rotatably mounted in the opening, and the motor means having a motor and gear means, said gear means coupling the motor to the handle for remotely rotating the handle.

* * * * *